United States Patent
Castagna

(10) Patent No.: US 10,402,796 B2
(45) Date of Patent: Sep. 3, 2019

(54) APPLICATION LIFE-CYCLE TRANSITION RECORD RECREATION SYSTEM

(71) Applicant: BANK OF AMERICA CORPORATION, Charlotte, NC (US)

(72) Inventor: Brandon Matthew Castagna, Mount Holly, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 403 days.

(21) Appl. No.: 15/249,894

(22) Filed: Aug. 29, 2016

(65) Prior Publication Data

US 2018/0060836 A1 Mar. 1, 2018

(51) Int. Cl.
- G06Q 20/10 (2012.01)
- G06Q 20/02 (2012.01)
- G06Q 20/06 (2012.01)
- G06Q 20/38 (2012.01)

(52) U.S. Cl.
CPC ........... *G06Q 20/10* (2013.01); *G06Q 20/023* (2013.01); *G06Q 20/0655* (2013.01); *G06Q 20/389* (2013.01)

(58) Field of Classification Search
CPC ................. G06Q 40/02–06; G06Q 20/10
See application file for complete search history.

(56) References Cited

U.S. PATENT DOCUMENTS

| 5,671,283 A | 9/1997 | Michener et al. |
| 5,835,599 A | 11/1998 | Buer |
| 6,073,234 A | 6/2000 | Kigo et al. |
| 6,324,286 B1 | 11/2001 | Lai et al. |
| 6,330,655 B1 | 12/2001 | Vishlitzky et al. |
| 6,725,303 B1 | 4/2004 | Hoguta et al. |
| 6,850,252 B1 | 2/2005 | Hoffberg |
| 6,973,187 B2 | 12/2005 | Gligor et al. |
| 7,055,039 B2 | 5/2006 | Chavanne et al. |

(Continued)

FOREIGN PATENT DOCUMENTS

| WO | 2014162296 A1 | 10/2014 |
| WO | 2015135018 A1 | 9/2015 |

OTHER PUBLICATIONS

Bradley Hope et al., "A Bitcoin Technology Gets Nasdaq Test"; May 10, 2015; retrieved from http://www.wsj.com/articles/a-bitcoin-technology-gets-nasdaq-test-1431296886.

(Continued)

*Primary Examiner* — Eric T Wong
(74) *Attorney, Agent, or Firm* — Michael A. Springs; Moore & Van Allen PLLC; Nicholas C. Russell

(57) ABSTRACT

Embodiments of the invention are directed to a system, method, or computer program product for utilizing a block chain distributed network for generation of blocks with searchable metadata code embedded therein for recreating a historic record of how a transaction is processed from a client origination to external clearing. The invention provides a process by which a distributed ledger technology is utilized to store complete payment structures and their events across application life-cycles to recreate a historic record of event processing. The record allows for complex tracking and tracing across complex event processing where data points are received, spliced, and processed across multiple applications in a high quantity high velocity environment.

20 Claims, 7 Drawing Sheets

(56) References Cited

U.S. PATENT DOCUMENTS

| | | |
|---|---|---|
| 7,092,400 B2 | 8/2006 | Malzahn |
| 7,184,549 B2 | 2/2007 | Sorimachi et al. |
| 7,362,859 B1 | 4/2008 | Robertson et al. |
| 7,392,384 B2 | 6/2008 | Hopkins et al. |
| 7,428,306 B2 | 9/2008 | Celikkan et al. |
| 7,502,933 B2 | 3/2009 | Jakobsson et al. |
| 7,574,401 B1 | 8/2009 | Burns |
| 7,649,992 B2 | 1/2010 | Raju et al. |
| 7,712,657 B1 | 5/2010 | Block et al. |
| 7,764,788 B2 | 7/2010 | Tardo |
| 7,979,889 B2 | 7/2011 | Gladstone et al. |
| 8,078,874 B2 | 12/2011 | You et al. |
| 8,107,621 B2 | 1/2012 | Celikkan et al. |
| 8,155,311 B2 | 4/2012 | Shin et al. |
| 8,259,934 B2 | 9/2012 | Karroumi et al. |
| 8,302,153 B1 | 10/2012 | Garrity et al. |
| 8,358,781 B1 | 1/2013 | Schneider |
| 8,397,841 B1 | 2/2013 | Taylor et al. |
| 8,396,209 B2 | 3/2013 | Schneider |
| 8,416,947 B2 | 4/2013 | Schneider |
| 8,458,461 B2 | 6/2013 | Tardo |
| 8,464,320 B2 | 6/2013 | Archer et al. |
| 8,516,266 B2 | 8/2013 | Hoffberg et al. |
| 8,590,055 B2 | 11/2013 | Yoon et al. |
| 8,725,635 B2 | 5/2014 | Klein et al. |
| 8,737,606 B2 | 5/2014 | Taylor et al. |
| 8,942,374 B2 | 1/2015 | Fujisaki |
| 8,983,063 B1 | 3/2015 | Taylor et al. |
| 9,004,353 B1 | 4/2015 | Block et al. |
| 9,059,866 B2 | 6/2015 | Bar-Sade et al. |
| 9,083,702 B2 | 7/2015 | Wied et al. |
| 9,092,766 B1 | 7/2015 | Bedier et al. |
| 9,298,806 B1 | 3/2016 | Vessenes et al. |
| 9,319,469 B2 | 4/2016 | Ruhlen et al. |
| 9,355,530 B1 | 5/2016 | Block et al. |
| 9,635,000 B1 | 4/2017 | Muftic |
| 9,672,499 B2 | 6/2017 | Yang et al. |
| 9,722,790 B2 | 8/2017 | Ebrahimi |
| 9,805,213 B1 | 10/2017 | Kragh |
| 9,818,092 B2 | 11/2017 | Pennanen |
| 10,021,672 B2 | 7/2018 | Cole et al. |
| 2001/0020249 A1 | 9/2001 | Shim |
| 2003/0126094 A1 | 7/2003 | Fisher et al. |
| 2003/0167329 A1 | 9/2003 | Kurakake et al. |
| 2004/0172535 A1 | 9/2004 | Jakobsson et al. |
| 2004/0199463 A1* | 10/2004 | Deggendorf .......... G06Q 20/10 705/39 |
| 2004/0268407 A1 | 12/2004 | Sparrell et al. |
| 2005/0256802 A1 | 11/2005 | Ammermann et al. |
| 2006/0053296 A1 | 3/2006 | Busboom et al. |
| 2006/0059539 A1 | 3/2006 | Shashikumar et al. |
| 2007/0136573 A1 | 6/2007 | Steinberg |
| 2008/0301043 A1 | 12/2008 | Unbehagen |
| 2009/0070241 A1 | 3/2009 | Manohar |
| 2009/0094075 A1 | 4/2009 | Parisien et al. |
| 2009/0125986 A1 | 5/2009 | Kiester et al. |
| 2009/0281948 A1 | 11/2009 | Carlson |
| 2010/0107225 A1 | 4/2010 | Spencer et al. |
| 2010/0279653 A1 | 11/2010 | Poltorak |
| 2011/0055913 A1 | 3/2011 | Wong |
| 2011/0078073 A1 | 3/2011 | Annappindi |
| 2011/0197064 A1 | 8/2011 | Garcia Morchon et al. |
| 2012/0066121 A1 | 3/2012 | Shahbazi et al. |
| 2012/0096529 A1 | 4/2012 | Bournelle et al. |
| 2012/0271920 A1 | 10/2012 | Isaksson |
| 2012/0284175 A1 | 11/2012 | Wilson et al. |
| 2013/0198061 A1 | 8/2013 | Dheer et al. |
| 2013/0204783 A1 | 8/2013 | Klose et al. |
| 2013/0232056 A1 | 9/2013 | Schulman |
| 2013/0311375 A1 | 11/2013 | Priebatsch |
| 2013/0346294 A1 | 12/2013 | Faith et al. |
| 2014/0006185 A1 | 1/2014 | Zurn et al. |
| 2014/0040114 A1 | 2/2014 | Baumgart et al. |
| 2014/0089243 A1 | 3/2014 | Oppenheimer |
| 2014/0114857 A1 | 4/2014 | Griggs et al. |
| 2014/0295956 A1 | 10/2014 | Katz et al. |
| 2014/0310171 A1 | 10/2014 | Grossman et al. |
| 2014/0344153 A1 | 11/2014 | Raj et al. |
| 2015/0032627 A1 | 1/2015 | Dill et al. |
| 2015/0052587 A1 | 2/2015 | O'Neill et al. |
| 2015/0100495 A1 | 4/2015 | Salama et al. |
| 2015/0127527 A1 | 5/2015 | Eide |
| 2015/0172053 A1 | 6/2015 | Schwarz et al. |
| 2015/0206106 A1 | 7/2015 | Yago |
| 2015/0242605 A1 | 8/2015 | Du et al. |
| 2015/0244690 A1 | 8/2015 | Mossbarger |
| 2015/0254446 A1 | 9/2015 | LaCous et al. |
| 2015/0262137 A1* | 9/2015 | Armstrong .......... G06Q 20/065 705/41 |
| 2015/0262140 A1 | 9/2015 | Armstrong |
| 2015/0310424 A1 | 10/2015 | Myers |
| 2015/0332283 A1 | 11/2015 | Witchey |
| 2015/0356523 A1 | 12/2015 | Madden |
| 2015/0371224 A1 | 12/2015 | Lingappa |
| 2015/0379510 A1 | 12/2015 | Smith |
| 2015/0379636 A1 | 12/2015 | Szabo et al. |
| 2016/0012424 A1 | 1/2016 | Simon et al. |
| 2016/0028552 A1 | 1/2016 | Spanos et al. |
| 2016/0035054 A1 | 2/2016 | Branscomb et al. |
| 2016/0050203 A1 | 2/2016 | Hefetz |
| 2016/0092874 A1 | 3/2016 | O'Regan et al. |
| 2016/0125376 A1 | 5/2016 | Beatty et al. |
| 2016/0125414 A1 | 5/2016 | Desai et al. |
| 2016/0191243 A1 | 6/2016 | Manning |
| 2016/0203448 A1 | 7/2016 | Metnick et al. |
| 2016/0219045 A1 | 7/2016 | Toedter et al. |
| 2016/0260169 A1 | 9/2016 | Arnold et al. |
| 2016/0260171 A1 | 9/2016 | Ford et al. |
| 2016/0267474 A1 | 9/2016 | Lingham et al. |
| 2016/0275461 A1 | 9/2016 | Sprague et al. |
| 2016/0292672 A1* | 10/2016 | Fay ..................... G06Q 20/363 |
| 2016/0321654 A1 | 11/2016 | Lesavich et al. |
| 2016/0323109 A1 | 11/2016 | McCoy et al. |
| 2016/0342977 A1 | 11/2016 | Lam |
| 2016/0342978 A1 | 11/2016 | Davis et al. |
| 2016/0342989 A1 | 11/2016 | Davis |
| 2016/0342994 A1 | 11/2016 | Davis |
| 2016/0379211 A1 | 12/2016 | Hoyos et al. |
| 2017/0005804 A1 | 1/2017 | Zinder |
| 2017/0011460 A1* | 1/2017 | Molinari .............. G06Q 40/04 |
| 2017/0041296 A1 | 2/2017 | Ford et al. |
| 2017/0046526 A1 | 2/2017 | Chan et al. |
| 2017/0046651 A1 | 2/2017 | Lin et al. |
| 2017/0046652 A1 | 2/2017 | Haldenby et al. |
| 2017/0046664 A1 | 2/2017 | Haldenby et al. |
| 2017/0046680 A1 | 2/2017 | Crites |
| 2017/0046693 A1 | 2/2017 | Haldenby et al. |
| 2017/0046792 A1 | 2/2017 | Haldenby et al. |
| 2017/0046806 A1 | 2/2017 | Haldenby et al. |
| 2017/0048216 A1 | 2/2017 | Chow et al. |
| 2017/0053249 A1 | 2/2017 | Tunnell et al. |
| 2017/0054611 A1 | 2/2017 | Tiell |
| 2017/0085555 A1 | 3/2017 | Bisikalo et al. |
| 2017/0091397 A1 | 3/2017 | Shah |
| 2017/0103167 A1 | 4/2017 | Shah |
| 2017/0103461 A1 | 4/2017 | Acuña-Rohter et al. |
| 2017/0109735 A1* | 4/2017 | Sheng ................ G06Q 20/3678 |
| 2017/0116693 A1 | 4/2017 | Rae et al. |
| 2017/0132615 A1 | 5/2017 | Castinado et al. |
| 2017/0132621 A1 | 5/2017 | Miller et al. |
| 2017/0132625 A1 | 5/2017 | Kennedy |
| 2017/0132626 A1 | 5/2017 | Kennedy |
| 2017/0132630 A1 | 5/2017 | Castinado et al. |
| 2017/0140374 A1 | 5/2017 | O'Brien et al. |
| 2017/0140375 A1 | 5/2017 | Kunstel |
| 2017/0140394 A1 | 5/2017 | Cao et al. |
| 2017/0142024 A1 | 5/2017 | Fromentoux et al. |
| 2017/0149796 A1 | 5/2017 | Gvili |
| 2017/0155515 A1 | 6/2017 | Androulaki et al. |
| 2017/0163733 A1 | 6/2017 | Grefen et al. |
| 2017/0177855 A1 | 6/2017 | Costa Faidella et al. |
| 2017/0178131 A1 | 6/2017 | Fernandez et al. |
| 2017/0178237 A1 | 6/2017 | Wong |
| 2017/0180134 A1 | 6/2017 | King |

(56) References Cited

U.S. PATENT DOCUMENTS

| | | |
|---|---|---|
| 2017/0200137 A1 | 7/2017 | Vilmont |
| 2017/0213209 A1 | 7/2017 | Dillenberger |
| 2017/0214675 A1 | 7/2017 | Johnsrud et al. |
| 2017/0214698 A1 | 7/2017 | Hughes et al. |
| 2017/0220998 A1 | 8/2017 | Horn et al. |
| 2017/0221052 A1 | 8/2017 | Sheng et al. |
| 2017/0223005 A1 | 8/2017 | Birgisson et al. |
| 2017/0228447 A1 | 8/2017 | Catania et al. |
| 2017/0228822 A1* | 8/2017 | Creighton ............... G06Q 40/04 |
| 2017/0230375 A1 | 8/2017 | Kurian |
| 2017/0230378 A1 | 8/2017 | Bliss |
| 2017/0232300 A1 | 8/2017 | Tran et al. |
| 2017/0235955 A1 | 8/2017 | Barkan |
| 2017/0236407 A1 | 8/2017 | Rhoads et al. |
| 2017/0243020 A1 | 8/2017 | Dhondse et al. |
| 2017/0243193 A1 | 8/2017 | Manian et al. |
| 2017/0243208 A1 | 8/2017 | Kurian et al. |
| 2017/0243213 A1 | 8/2017 | Castinado et al. |
| 2017/0243287 A1 | 8/2017 | Johnsrud et al. |
| 2017/0339125 A1 | 11/2017 | Barrett |
| 2018/0053161 A1* | 2/2018 | Bordash ............... G06Q 20/102 |
| 2018/0268479 A1* | 9/2018 | Dowling ............. G06Q 40/025 |

OTHER PUBLICATIONS

Nathaniel Popper, "Bitcoin Technology Piques Interest on Wall Street"; Aug. 28, 2015 retrieved from http://www.nytimes.com/2015/08/31/business/dealbook/bitcoin-techno, Aug. 31, 2015.

Joseph C. Guagliardo et al., "Blockchain: Preparing for Disruption Like It's the '90s"; Mar. 14, 2016, retrieved from http://www.law360.com/articles/77120CVprint?section=ip.

Robert McMillian, "IBM Bets on Bitcoin Ledger"; Feb. 16, 2016, retrieved from http://www.wsj.com/articles/ibm-bets-on-bitcoin-ledger-1455598864.

Richard Lee Twesige, "A simple explanation of Bitcoin and Blockchain technology"; Jan. 2015, retrieved from http://www.researchgate.net/profile/Richard_Twesige/publication/270287317_Bitcoin_A_simple_explanation_of_Bitcoin_and_Block_Chain_technology_JANUARY_2015_RICHARD_LEE_TWESIGE/links/54a7836f0cf267bdb90a0ee6.pdf.

International Preliminary Report on Patentability for International Application No. PCT/IB2016/001655 dated May 15, 2018.

International Preliminary Report on Patentability for International Application No. PCT/US2016/061402 dated May 15, 2018.

International Search Report and Written Opinion for International Application No: PCT/US2016/061402 completed Dec. 27, 2016.

Tasca. "Digital currencies: Principles, trends, opportunities, and risks." In: Trends, Opportunities, and Risks. Sep. 7, 2015 (Sep. 7, 2015) Retrieved from <https://www.researchgate.net/profile/Paolo_Tasca/publication/290805276_Digital_Currencies_Principles_Trends_Opportunities_and_Risks/links/569bb91e08ae6169e5624552.pif> pp. 5, 10, 12, 14.

Lerner. "MAVEPAY a new lightweight payment scheme for peer to peer currency networks." Apr. 17, 2012 (Apr. 17, 2012) Retrieved from <https://pdfs.semanticscholar.org/1185/a26f014678b959876519065c2624458d75b8.pdf>, entire document.

Buterin, Vitalik, "On Public and Private Blockchains, Aug. 7, 2015, http", Aug. 7, 2015, https://blog.ethereum.org/2015/08/07/on-public-and-private-blockchains/.

Provisional Application filed Dec. 10, 2015 by Arjomand et al., "Attributable Digital Currency"; Nov. 21, 2017 in U.S. Appl. No. 15/049,777.

Malahov, Yanislav Georgiev, "BitAlias 1, AKA Usernames for Bitcoin, A New, Simple Naming System for Bitcoin Addresses", retrieved from the Internet<URL: https://medium.com/bitalias-decentralized-naming-and-identity-service/bitalias-71366bffed9d8#.ww4r3h4sn> on Mar. 12, 2017; Bringing Crypto to the People, Founder of www.aeternity.com, Jun. 6, 2015, 6 pages.

International Search Report completed on Mar. 12, 2017 and International Written Opinion completed on Mar. 11, 2017 for International application No. PCT/IB 16/01655 dated Apr. 7, 2017.

Ayodeji Odusote, "Money Journey—a Transient Stop At Block Chain"; 2.0 Africa News Service; (Year:2015) Retrieved from https://dialog.proquest.com/professional/docview/1705617247?accountid=142257.

Andreas M. Antonopolous, "Mastering Bitcoin", Dec. 2014, O'Reily Media, Inc. (Year: 2014).

* cited by examiner

APPLICATION LIFE-CYCLE TRANSITION RECORD RECREATION SYSTEM

BACKGROUND

Large amounts of data processing requires network and processes with multiple channels and multiple applications running in order to achieve a desired result. The memory, processing, and time requirements for large data processing can be great. Furthermore, with multiple processes running all at different stages with middleware between, a need exists to accurately track and record life-cycle processing.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address these and/or other needs by providing an innovative system, method and computer program product for providing application life-cycle transition record recreation system for recreating a historic record of how a transaction is processed from a client origination to external clearing.

The invention provides a process by which distributed ledger technology can be used to store complete payment structures and their transition across application life-cycles to recreate a historic record of how the transaction processed from client origination to external clearing. In this way, the system may use multiple accounts, such as file accounts, batch accounts, and payment accounts on a distributed ledger for each payment structure. The files are received from a client and are added to a file account within the network. Next, in some embodiments, the file record is debited from the file account and individual records are credited with the resource amount to the batch account for each batch in the file. The file record is debited from the batch account and individual records credited to the payment account for reach payment in the batch.

In this way, the invention provides the ability to use metadata to search and find complex tracking and tracing across accounts in real-time. Furthermore, in some embodiments, the invention creates a detailed technical report to present to internal support teams and creates a summary business report to present externally.

As such, the system utilizes blocks in a block chain environment as debit and/or credit blocks. Upon receiving a file and splitting the file into a batch for processing or for further splitting into payments, the system may generate a block for example debiting a file and crediting a batch. In this way, the block illustrates a transaction being debited from the file and being split into a batch, where the batch account is credited. This debiting and crediting generates blocks on a block chain that continually moves forward for each transaction tracking the transaction from initiation to external clearing.

Embodiments of the invention relate to systems, methods, and computer program products for application life-cycle transition record recreation, the invention comprising: receiving a file for processing to external clearing, wherein the file comprises one or more transactions; processing the file through processing structure via parsing the file to a batch; generating blocks on a private block chain distributed network, wherein the blocks comprise a debit of the file and a credit the batch upon parsing; processing the batch into payments via parsing; adding blocks to the private block chain distributed network, wherein the blocks comprise a debit of the batch and a credit the payment upon parsing; reassembling the payment into batches and files for external clearing; adding blocks to the private block chain distributed network, wherein the blocks comprise a credit of the batch and a debit of the payment upon reassembly; and compiling the blocks for each transaction to generate a life-cycle recreation of each transaction within the file.

In some embodiments, the blocks are formed into a block chain, wherein the block chain is associated with one transaction from the one or more transactions within the received file. In some embodiments, the block chain forms a life-cycle recreation of the transaction illustrating each file, batch, or payment being credited or debited with the transaction through the processing to external clearance.

In some embodiments, the invention further comprises searching and tracking of transactions via searchable metadata coded into the blocks of the block chain that are unique to each transaction, wherein searching for the metadata associated with a specific transaction generates a life-cycle report of the processing of the specific transaction.

In some embodiments, the invention further comprises triggering a generation of a block and associating the block with a block chain on the private block chain distributed network upon processing of a transaction through an application or event during the processing to external clearing.

In some embodiments, receiving the file further comprises receiving from a client a file of one or more payments for processing and external clearing to a user, wherein the transaction is an individual payment from the client to the user.

In some embodiments, the invention further comprises processing the one or more transactions as payments for validation and internal clearance prior to reassembling into a batch and file for external clearing.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
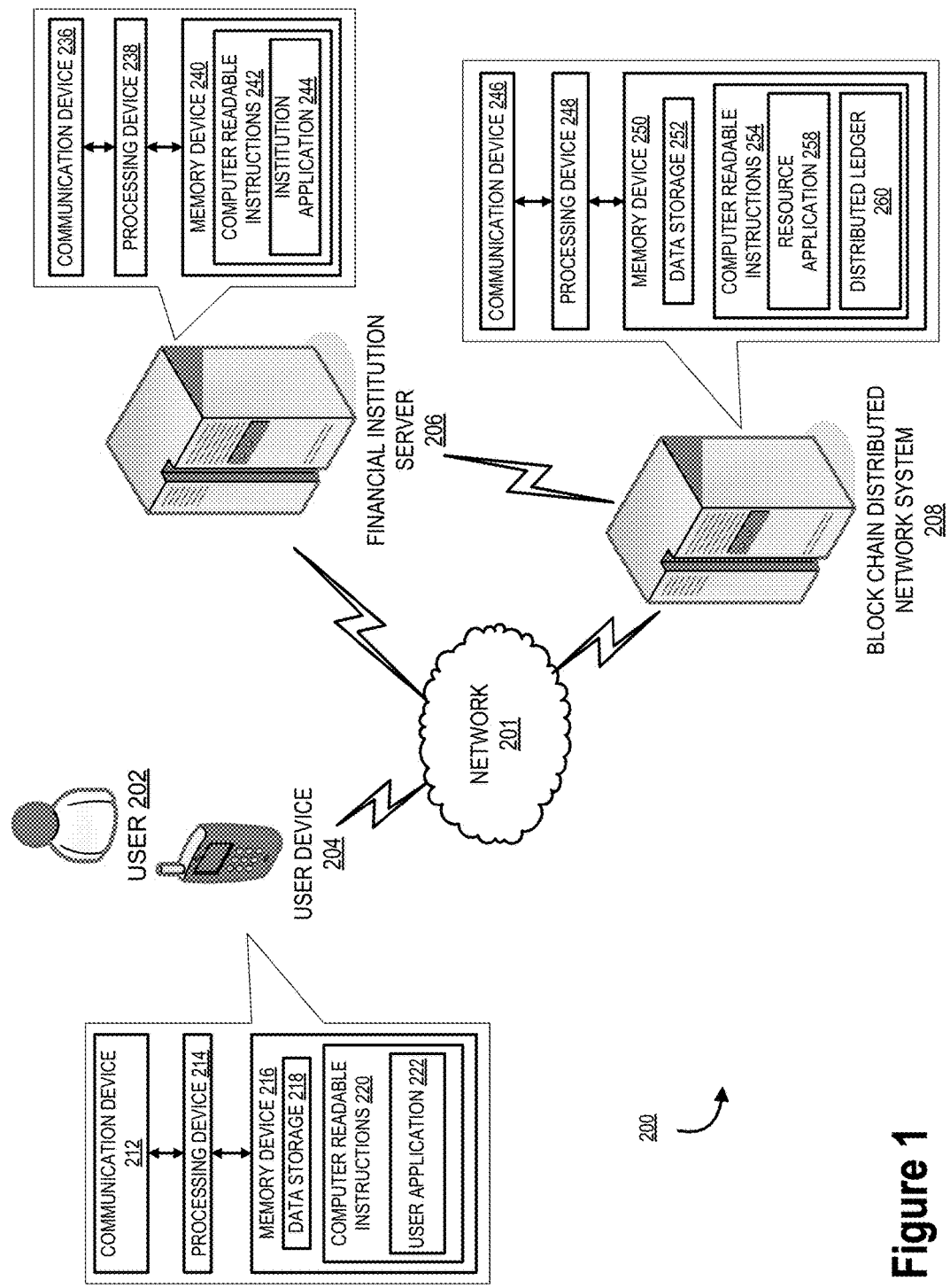
Figure 2A:
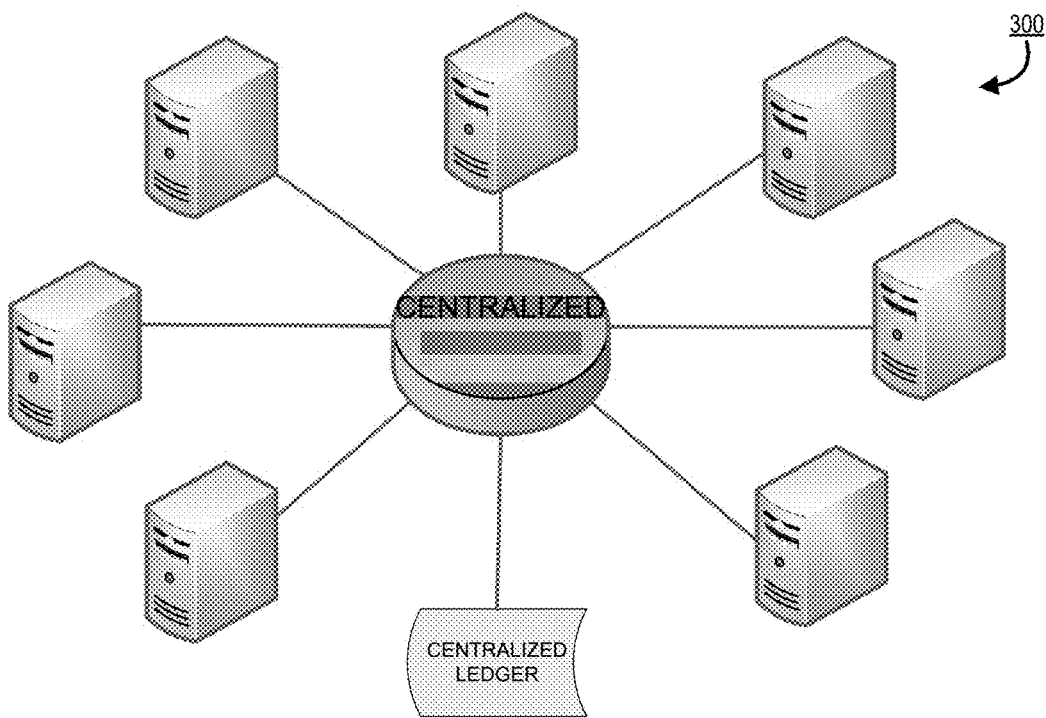
Figure 2B:
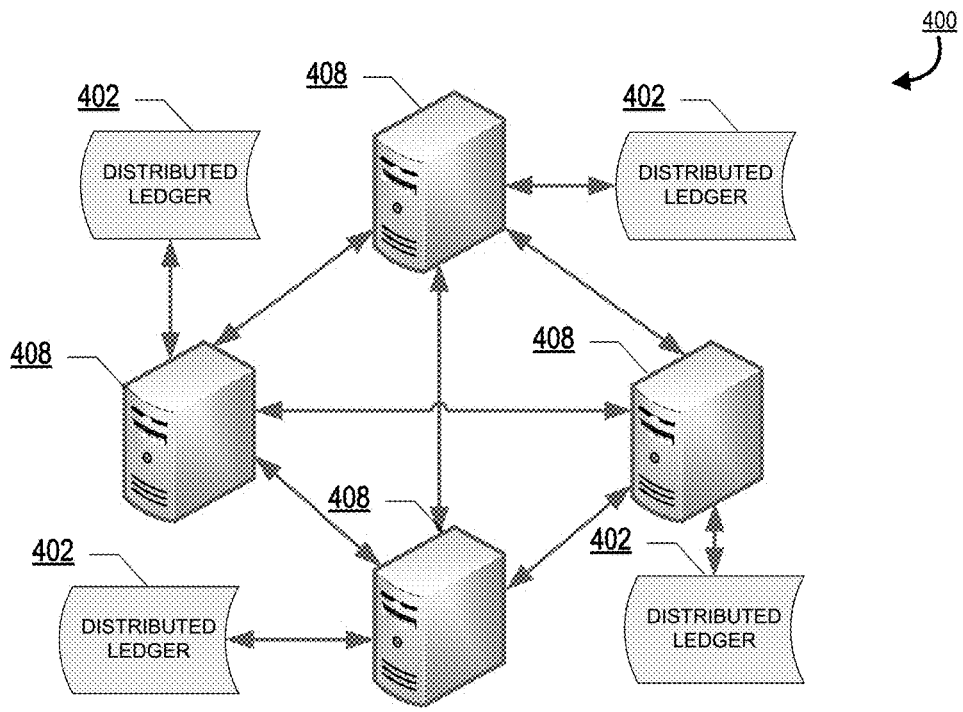
Figure 3:
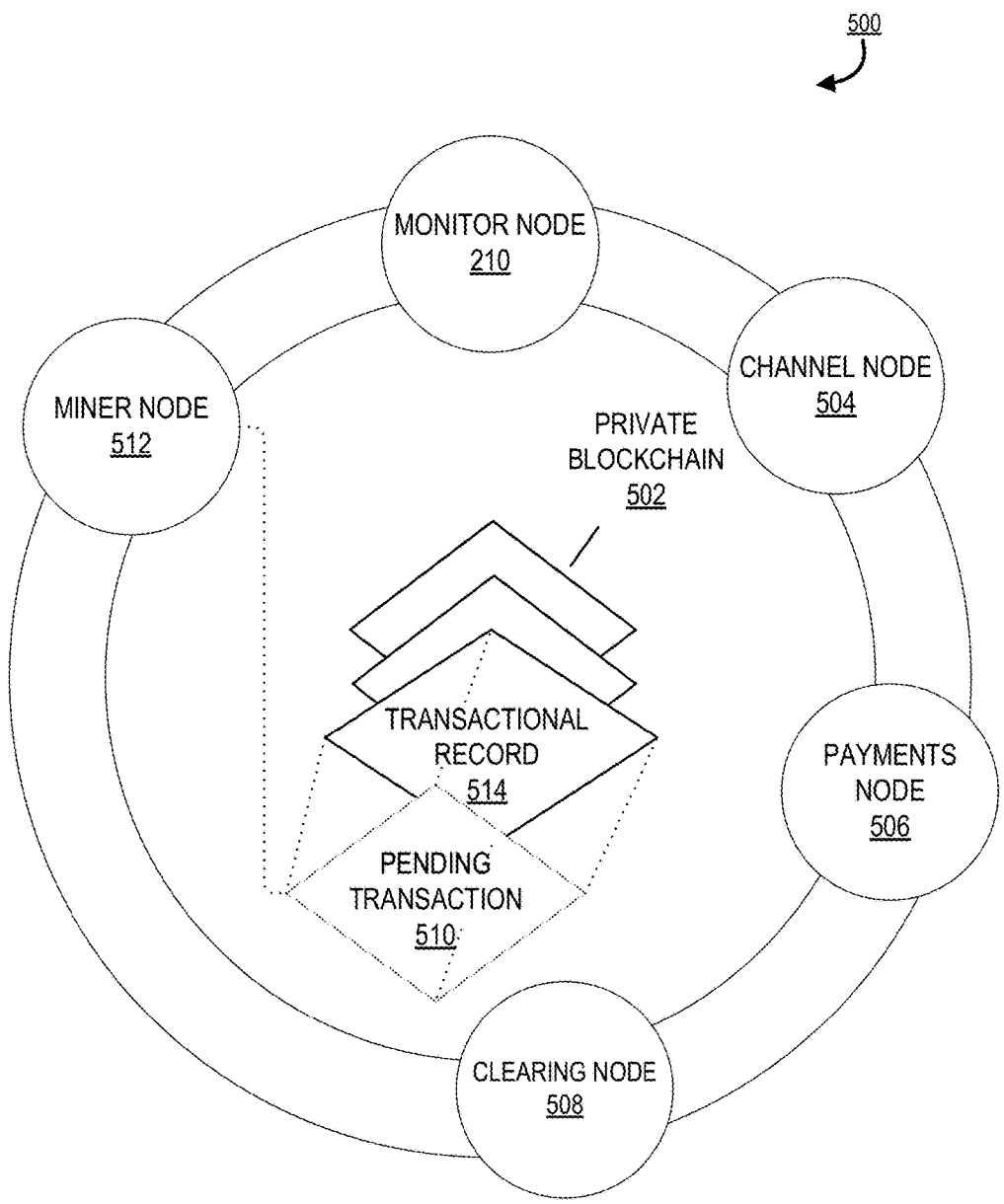
Figure 4:
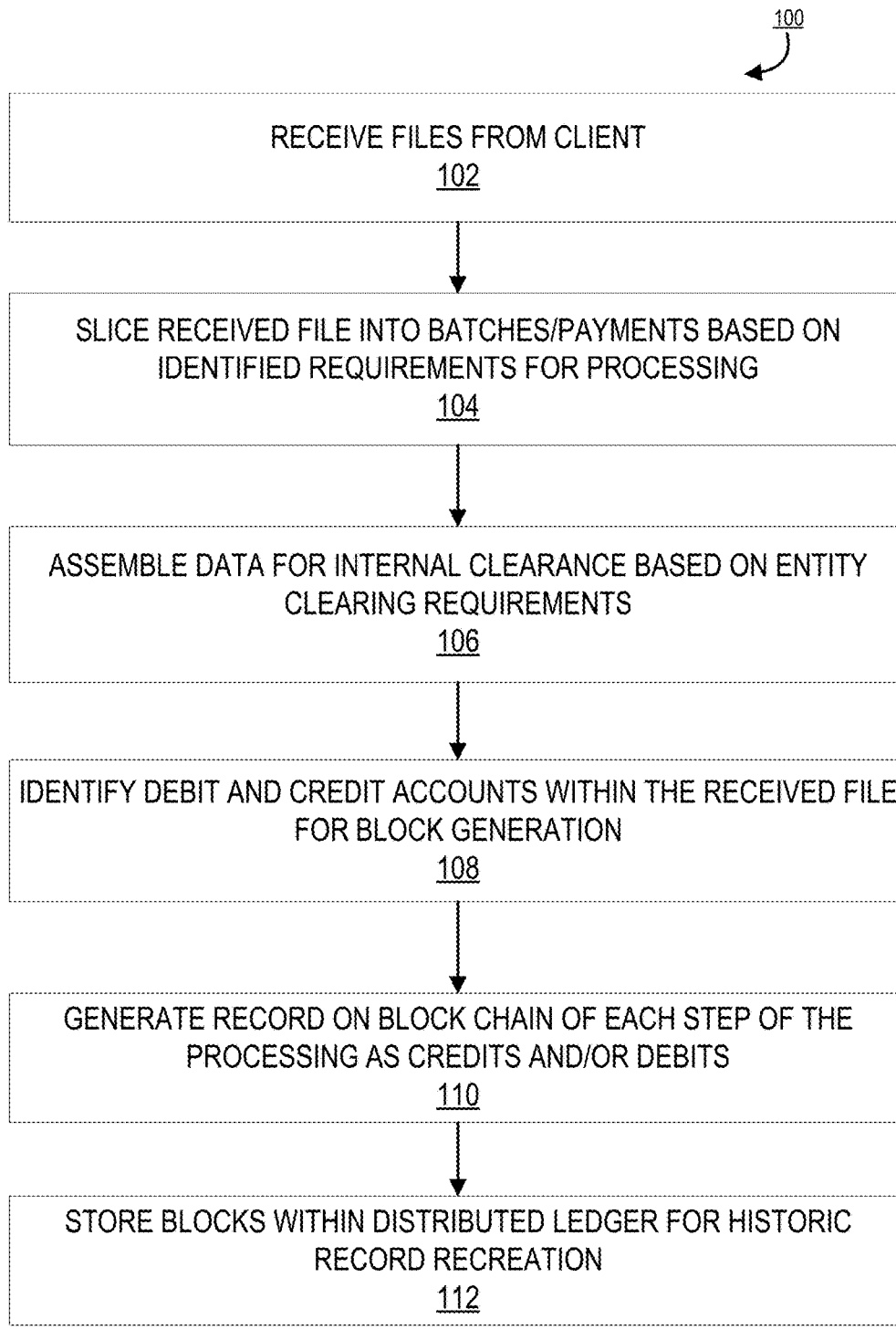
Figure 5:
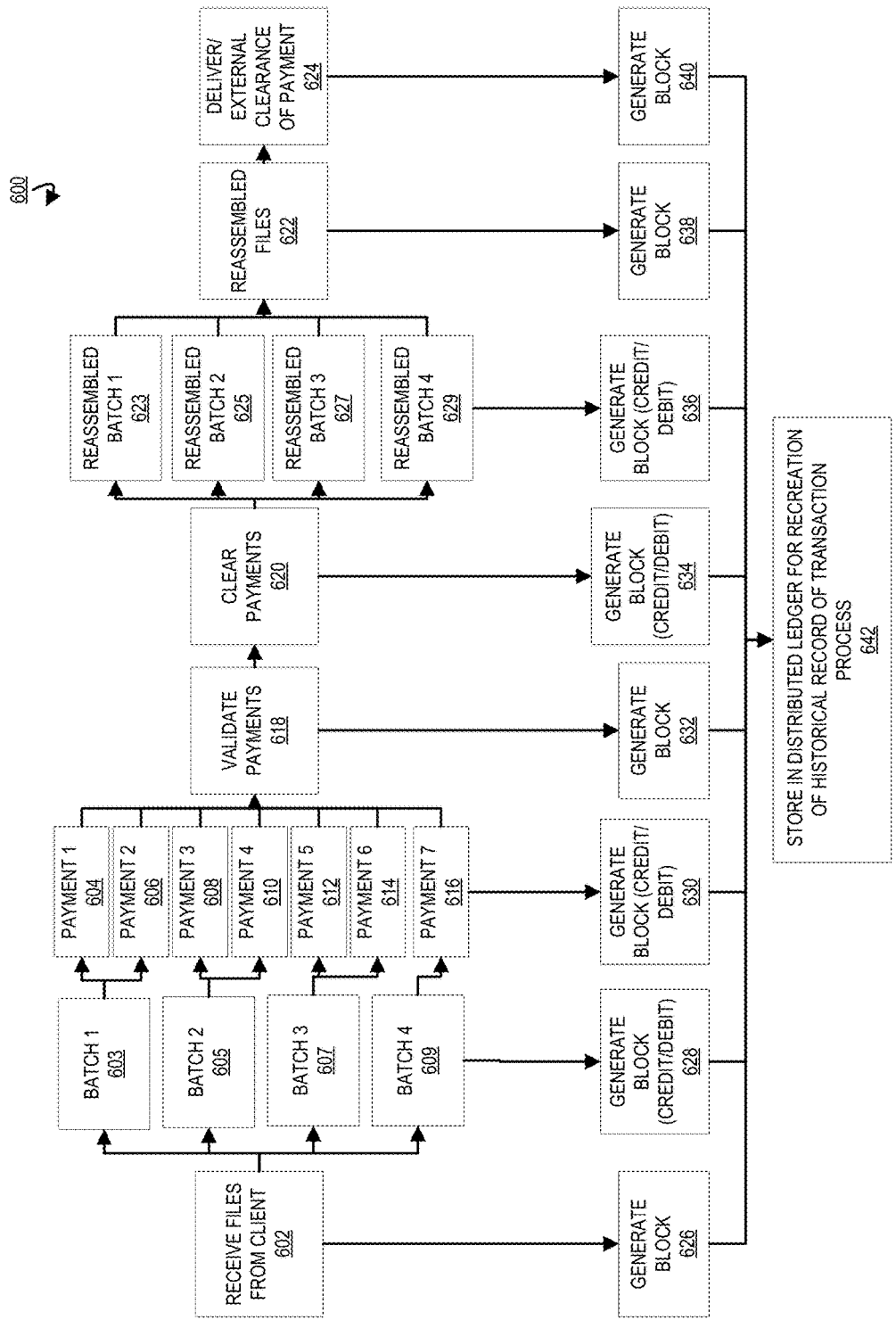
Figure 6:
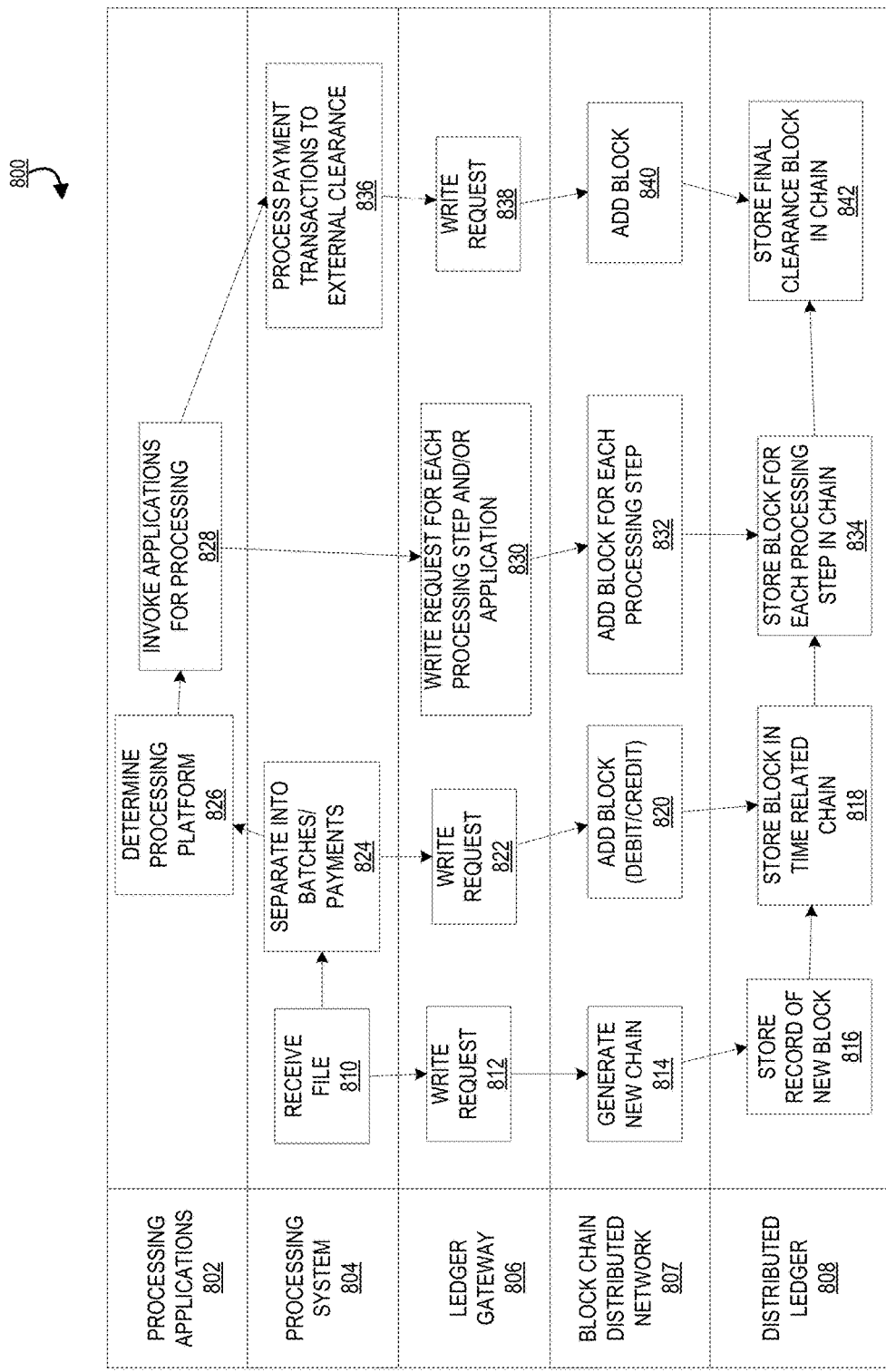
Figure 7:
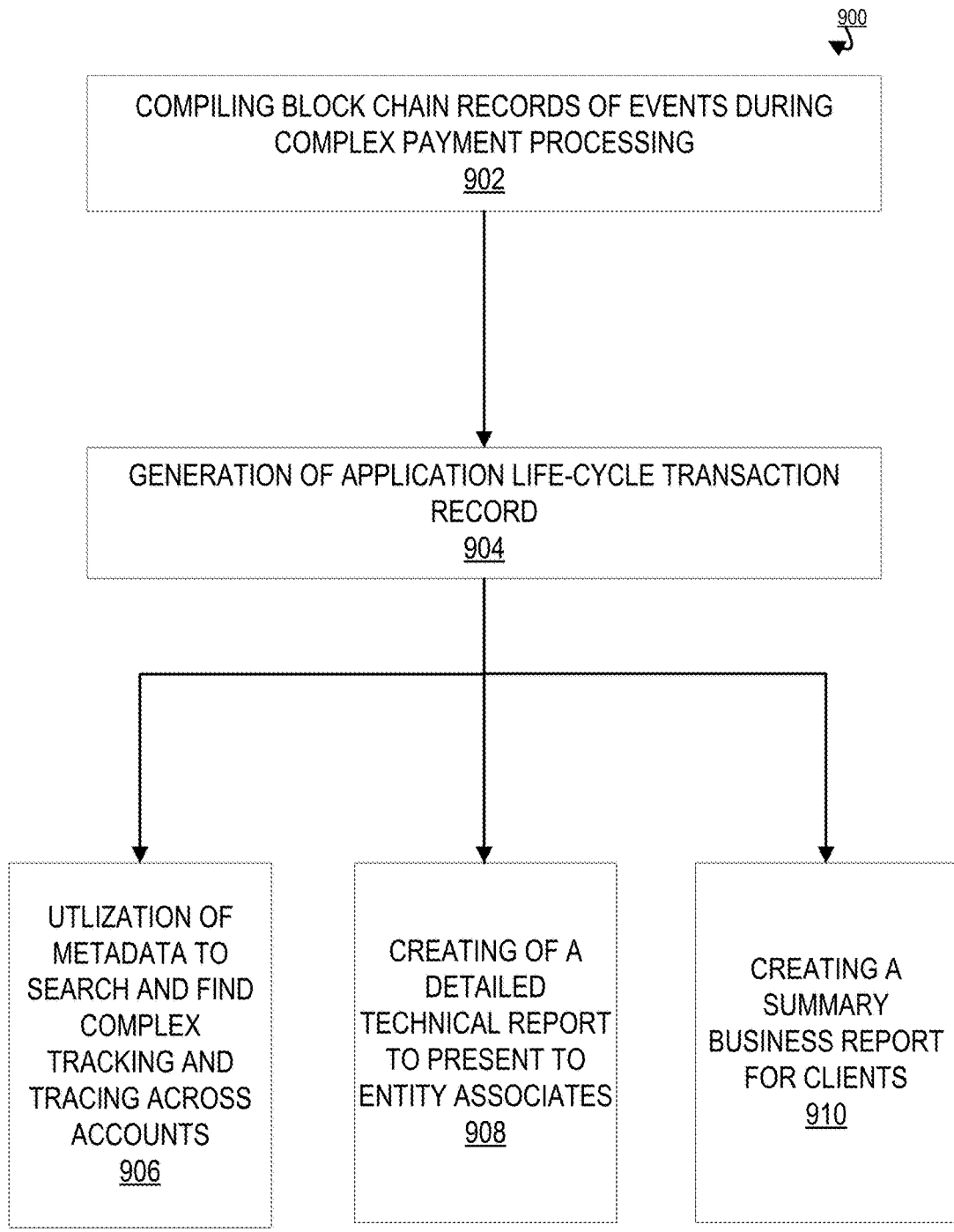

Having thus described embodiments of the invention in general terms, reference will now be made to the accompanying drawings, wherein:

FIG. 1 provides a high level application life-cycle transition record recreation system environment, in accordance with one embodiment of the present invention;

FIG. 2A provides centralized database architecture environment, in accordance with one embodiment of the present invention;

FIG. 2B provides a high level block chain system environment architecture, in accordance with one embodiment of the present invention;

FIG. 3 provides a high level process flow illustrating node interaction within a block chain system environment architecture, in accordance with one embodiment of the present invention;

FIG. 4 provides a high level process map illustrating the application life-cycle transition record recreation process, in accordance with one embodiment of the present invention;

FIG. 5 provides a process map illustrating generation of the block chain for application life-cycle transition record recreation, in accordance with one embodiment of the present invention;

FIG. 6 provides a detailed process map illustrating generation of the block chain for application life-cycle transition record recreation, in accordance with one embodiment of the present invention; and FIG. 7 provides a process map illustrating transformation and distribution of the record, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

Furthermore, as used herein the term "user device" or "mobile device" may refer to mobile phones, personal computing devices, tablet computers, wearable devices, and/or any portable electronic device capable of receiving and/or storing data therein.

An "account" is the relationship that a user has with an entity, such as a financial institution. Examples of accounts include a deposit account, such as a transactional account (e.g., a banking account), a savings account, an investment account, a money market account, a time deposit, a demand deposit, a pre-paid account, a credit account, a non-monetary user profile that includes information associated with the user, or the like. The account is associated with and/or maintained by the entity. "Resources" include accounts of the user and/or other property owned by the user. The resources may be associated with accounts or may be property that is not associated with a specific account. Examples of resources associated with accounts may be accounts that have cash or cash equivalents, or accounts that are funded with or contain property, such as safety despots box account that jewelry, a trust account that is funded with property, or the like. Examples of resources that may not be associated with accounts may be antiques in a user's home, jewelry in a user's home, or the like. "Funds" or "Available Balance" are a balance in an account that can be invested or withdrawn. For example, the funds may refer to a bank ledger balance minus the amount of any monetary checks in the process of collection. Funds may also be referred to as an available balance, a collected balance, good funds, and usable funds.

A "transaction" or "resource distribution" refers to any communication between a user and the financial institution or other entity monitoring the user's activities. Alternatively, in some embodiments, the term "transaction" may be used when describing the block chain database as a transaction type of record. The transaction type records consists of the actual data stored in the block chain. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

A "user" may be a financial institution user (e.g., an account holder or a person who have an account (e.g., banking account, credit account, or the like)). In one aspect, a user may be an entity or another financial institution requesting payment processing. In some embodiments, a "user" may be a financial institution employee (e.g., an underwriter, a project manager, an IT specialist, a manager, an administrator, an internal operations analyst, bank teller or the like) capable of operating the system described herein. For purposes of this invention, the term "user" and "user" may be used interchangeably.

Embodiments of the present invention address the above needs and/or achieve other advantages by providing apparatuses (e.g., a system, computer program product and/or other devices) and methods for application life-cycle transition record recreation. Large data processing for complex payment structures requires data processing thought multiple applications for uploading, validation, clearing, posting, and the like. Even more requirements may be necessary for posting payment routing on an international scale. Tracking the location of a particular payment from a debiting account to a crediting account through the processing process is difficult. This invention utilizes a block chain infrastructure with a specialized distributed ledger system for storing each process point of the complete payment structure for each transaction together in a block chain style format. The blocks store data packets of information pertaining to the processing of that particular transaction within the process and are chained together to form a time stamped historic record of the transaction processed from the client origination to external clearing. Using metadata the system allows for searching and finding complex tracking and tracing across individual transactions or accounts.

Embodiments of the invention utilize a private block chain to control transaction workflow amongst compute nodes, provide automatic authorization of transactions in the workflow, and provide efficient record-keeping functions within the virtual ledgers in an upstream and a downstream application. By using a private distributed ledger in this manner, the system addresses the computer networking-centric challenge of monitoring and providing a real-time tracking and tracing of the processing of transactions in a secure and efficient manner.

"Block chain" as used herein refers to a decentralized electronic ledger of data records which are authenticated by a federated consensus protocol. Multiple computer systems within the block chain, referred to herein as "nodes" or "compute nodes," each comprise a copy of the entire ledger of records. Nodes may write a data "block" to the block chain, the block comprising data regarding a transaction. In some embodiments, only miner nodes may write transactions to the block chain. In other embodiments, all nodes have the ability to write to the block chain. In some embodiments, the block may further comprise a time stamp and a pointer to the previous block in the chain. In some embodiments, the block may further comprise metadata indicating the node that was the originator of the transaction. In this way, the entire record of transactions is not dependent on a single database which may serve as a single point of failure; the block chain will persist so long as the nodes on the block chain persist. A "private block chain" is a block chain in which only authorized nodes may access the block chain. In some embodiments, nodes must be authorized to write to the block chain. In some embodiments, nodes must also be authorized to read from the block chain. Once a transactional record is written to the block chain, it will be considered pending and awaiting authentication by the miner nodes in the block chain.

"Miner node" as used herein refers to a networked computer system that authenticates and verifies the integrity of pending transactions on the block chain. The miner node ensures that the sum of the outputs of the transaction within the block matches the sum of the inputs. In some embodiments, a pending transaction may require validation by a threshold number of miner nodes. Once the threshold number of miners has validated the transaction, the block becomes an authenticated part of the block chain. By using this method of validating transactions via a federated consensus mechanism, duplicate or erroneous transactions are prevented from becoming part of the accepted block chain, thus reducing the risk of data record tampering and increasing the security of the transactions within the system.

Embodiments of the invention provide a virtual private ledger system maintained between an upstream entity and a downstream entity. In some embodiments, the downstream entity may be a financial institution. Embodiments use a private ledger to write transaction records to the private block chain, where the transaction records written to the block chain represent the transactional data within the private ledger. The downstream entity accesses the block chain and executes a number of processes based only on the authenticated blocks within the block chain, thereby eliminating the need for the downstream application to continuously seek confirmations from the downstream application. This increases the efficiency of the system while simultaneously increasing security and decreasing data error rates.

Embodiments of the invention also provide a system for distributing transaction workflow in a private block chain. In some embodiments, each of the nodes on the private block chain are responsible for performing one or more functions to process the transaction. In particular, each node monitors the block chain for blocks that are relevant to it while ignoring the blocks that are not relevant. Upon discovering a relevant block, the node performs its designated functions to process the transaction, i.e. the blocks within the block chain trigger the nodes to perform their functions. Once a block has been authenticated, a node may rely on the data record stored therein without utilizing a complex reconciliation system to confirm the data's integrity. By using the block chain to control the workflow of the transaction, the system may avoid data errors resulting from failure in communications amongst nodes and prevents the need for computing resource-intensive data reconciliation processes.

Embodiments of the invention also provide a system for authorizing block chain transactions by distributed ledger keys. In such an embodiment, each block comprises a transaction record and an authorization key, indicating the originating node (the sender) of the transaction. The nodes within the private block chain comprise a "white list," comprising a list of authorized senders of the transaction. In this way, a receiving node will only process a transaction in the block chain if the sender is one of the authorized senders on the white list; otherwise, the node rejects the transaction, thereby increasing the security of transactions within the system. In some embodiments, the node may write a rejection block to the block chain.

FIG. 1 provides a unique system that includes specialized servers and system communicably linked across a distributive network of nodes required to perform the functions of generation of an application life-cycle transition record for complex payment transaction processing.

FIG. 1 provides a high level application life-cycle transition record recreation system environment 200, in accordance with one embodiment of the present invention. As illustrated in FIG. 1, the block chain distributed network system 208 is operatively coupled, via a network 201 to the user system 204, and to the financial institution server 206. In this way, the block chain distributed network system 208 can send information to and receive information from the user device 204 and the financial institution server 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual that either provides a payment to the payment system for processing or is an individual receiving a payment or credit from the payment processing system. In other embodiments, a user 202 is an entity providing a file or file batch to the system for complex payment processing. In other embodiments a user 202 is an associate of the financial institution providing the payment processing or the financial institution entity. In some embodiments, the user 202 has a user device, such as a mobile phone, tablet, or the like. FIG. 1 also illustrates a user system 204. The user device 204 may be, for example, a desktop personal computer, a mobile system, such as a cellular phone, smart phone, personal data assistant (PDA), laptop, or the like. The user device 204 generally comprises a communication device 212, a processing device 214, and a memory device 216. The user device 204 is a computing system that provide authentication for resource viewing. The processing device 214 is operatively coupled to the communication device 212 and the memory device 216. The processing device 214 uses the communication device 212 to communicate with the network 201 and other devices on the network 201, such as, but not limited to the financial institution server 206 and the block chain distributed network system 208. As such, the communication device 212 generally comprises a modem, server, or other device for communicating with other devices on the network 201.

The user device 204 comprises computer-readable instructions 220 and data storage 218 stored in the memory device 216, which in one embodiment includes the computer-readable instructions 220 of a user application 222. In some embodiments, the user application 222 allows a user 202 to provide authentication for resource viewing.

As further illustrated in FIG. 1, the block chain distributed network system 208 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the financial institution server 206 and the user system 204. As such, the communication device 246 generally comprises a modem, server, or other device for communicating with other devices on the network 201.

As further illustrated in FIG. 1, the block chain distributed network system 208 comprises computer-readable instructions 254 stored in the memory device 250, which in one embodiment includes the computer-readable instructions 254 of a resource application 258. In some embodiments, the memory device 250 includes data storage 252 for storing data related to the system environment, but not limited to data created and/or used by the resource application 258.

Embodiments of the block chain distributed network system 208 may include multiple systems, servers, computers or the like maintained by one or many entities. FIG. 1 merely illustrates one of those systems that, typically, interacts with many other similar systems to form the block chain. The block chain distributed network system 208 will be outlined below in more detail with respect to FIGS. 2-4. In one embodiment of the invention, the block chain distributed network system 208 is operated by a second entity that is a different or separate entity from the financial institution server 206. In some embodiments, the financial institution server 206 may be part of the block chain. Similarly, in some embodiments, the block chain distributed network system 208 is part of the financial institution server 206. In other embodiments, the financial institution server 206 is distinct from the block chain distributed network system 208.

In one embodiment of the block chain distributed network system 208 the memory device 250 stores, but is not limited to, a resource application 258 and a distributed ledger 260. In some embodiments, the distributed ledger 260 stores data including, but not limited to, the block chains for record reconciliation of the processing of payments across applications, smart contract logic and rules, and the like. In one embodiment of the invention, both the resource application 258 and the distributed ledger 260 may associate with applications having computer-executable program code that instructs the processing device 248 to operate the network communication device 246 to perform certain communication functions involving described herein. In one embodiment, the computer-executable program code of an application associated with the distributed ledger 260 and resource application 258 may also instruct the processing device 248 to perform certain logic, data processing, and data storing functions of the application.

The processing device 248 is configured to use the communication device 246 to gather data, such as data corresponding to transactions, blocks or other updates to the distributed ledger 260 from various data sources such as other block chain network system. The processing device 248 stores the data that it receives in its copy of the distributed ledger 260 stored in the memory device 250.

As illustrated in FIG. 1, the financial institution server 206 is connected to the block chain distributed network system 208 and is associated with a financial institution network. In this way, while only one financial institution server 206 is illustrated in FIG. 1, it is understood that multiple network systems may make up the system environment 200. The financial institution server 206 generally comprises a communication device 236, a processing device 238, and a memory device 240. The financial institution server 206 comprises computer-readable instructions 242 stored in the memory device 240, which in one embodiment includes the computer-readable instructions 242 of an institution application 244. The financial institution server 206 may communicate with the block chain distributed network system 208 to provide real-time resource availability for a user account. While the block chain distributed network system 208 may communicate with the financial institution server 206 via a secure connection generated for secure encrypted communications between the two systems.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2A illustrates a centralized database architecture environment 300, in accordance with one embodiment of the present invention. The centralized database architecture comprises multiple nodes from one or more sources and converge into a centralized database. The system, in this embodiment, may generate a single centralized ledger for data received from the various nodes. The single centralized ledger for data provides a difficult avenue for reviewing a record of a single transaction or payment process as it moves through the various applications for processing. There is no means to track the individual payment through the process at any point until it has been completely posted. Even at that point, with the amount of data a centralized database digests regularly in a complex payment structure, the ability to accurately track and trace a single transaction point or account through the process is not possible.

FIG. 2B provides a general block chain system environment architecture 400, in accordance with one embodiment of the present invention. Rather than utilizing a centralized database of data for instrument conversion, as discussed above in FIG. 2A, various embodiments of the invention may use a decentralized block chain configuration or architecture as shown in FIG. 2B in order to facilitate the converting of an instrument from a non-secured or secured format to a verified secured format. Such a decentralized block chain configuration ensures accurate mapping of resources available within an account associated with an instrument. Accordingly, a block chain configuration may be used to maintain an accurate ledger of transactions and the processing of each transaction through the processing applications by generation of a time stamped block and building of one or more blocks each stage of the processing for the transaction. In this way, building a traceable and trackable historic view of each transaction within each account, capable of being searched and identified.

A block chain is a distributed database that maintains a list of data records, such as real-time resource availability associated with one or more accounts or the like, the security of which is enhanced by the distributed nature of the block chain. A block chain typically includes several nodes, which may be one or more systems, machines, computers, databases, data stores or the like operably connected with one another. In some cases, each of the nodes or multiple nodes are maintained by different entities. A block chain typically works without a central repository or single administrator. One well-known application of a block chain is the public ledger of transactions for cryptocurrencies. The data records recorded in the block chain are enforced cryptographically and stored on the nodes of the block chain.

A block chain provides numerous advantages over traditional databases. A large number of nodes of a block chain may reach a consensus regarding the validity of a transaction contained on the transaction ledger. As such, the status of the instrument and the resources associated therewith can be validated and cleared by one participant.

The block chain system typically has two primary types of records. The first type is the transaction type, which consists of the actual data stored in the block chain. The second type is the block type, which are records that confirm when and in what sequence certain transactions became recorded as part of the block chain. Transactions are created by participants using the block chain in its normal course of business, for example, when someone sends cryptocurrency to another person, and blocks are created by users known as "miners" who use specialized software/equipment to create blocks. In some embodiments, the block chain system is closed, as such the number of miners in the current system are known and the system comprises primary sponsors that generate and create the new blocks of the system. As such, any block may be worked on by a primary sponsor. Users of the block chain create transactions that are passed around to various nodes of the block chain. A "valid" transaction is one that can be validated based on a set of rules that are defined by the particular system implementing the block chain. For example, in the case of cryptocurrencies, a valid transaction is one that is digitally signed, spent from a valid digital wallet and, in some cases that meets other criteria.

As mentioned above and referring to FIG. 2B, a block chain system 400 is typically decentralized—meaning that a distributed ledger 402 (i.e., a decentralized ledger) is maintained on multiple nodes 408 of the block chain 400. One node in the block chain may have a complete or partial copy of the entire ledger or set of transactions and/or blocks on the block chain. Transactions are initiated at a node of a block chain and communicated to the various nodes of the block chain. Any of the nodes can validate a transaction, add the transaction to its copy of the block chain, and/or broadcast the transaction, its validation (in the form of a block) and/or other data to other nodes. This other data may include time-stamping, such as is used in cryptocurrency block chains. In some embodiments, the nodes 408 of the system might be financial institutions that function as gateways for other financial institutions. For example, a credit union might hold the account, but access the distributed system through a sponsor node.

Various other specific-purpose implementations of block chains have been developed. These include distributed domain name management, decentralized crowd-funding, synchronous/asynchronous communication, decentralized real-time ride sharing and even a general purpose deployment of decentralized applications.

FIG. 3 provides a high level process flow illustrating node interaction within a block chain system environment architecture 500, in accordance with one embodiment of the present invention. As illustrated and discussed above, the block chain system may comprise at least one or more nodes used to generate blocks and process transactional records for generation of the life-cycle record recreation.

In some embodiments, the channel node 504, payments node 506, or the clearing node 508 may publish a pending transaction 510 to the private block chain 502. At this stage, the transaction has not yet been validated by the miner node(s) 512, and the other nodes will delay executing their designated processes. The miner node 512 may be configured to detect a pending transaction 510 or steps in the processing of the payment transaction in the block chain and conduct its processes to evaluate the validity of the data therein. Upon verifying the integrity of the data in the pending transaction 510, the miner node 512 validates the transaction and adds the data as a transactional record 514, which is referred to as a block in some embodiments of the application, to the private block chain 502. Once a transaction has been authenticated in this manner, the nodes will consider the transactional record 514 to be valid and thereafter execute their designated processes accordingly. The transactional record 514 will provide information about what process or application the payment transaction was just processed through and metadata coded therein for searchablity of the transactional record 514 within a distributed ledger.

In some embodiments, the system may comprise at least one additional miner node 512. The system may require that pending transactions 510 be validated by a plurality of miner nodes 512 before becoming authenticated blocks on the block chain. In some embodiments, the systems may impose a minimum threshold number of miner nodes 512 needed to verify each pending transaction. The minimum threshold may be selected to strike a balance between the need for data integrity/accuracy versus expediency of processing. In this way, the efficiency of the computer system resources may be maximized.

Furthermore, in some embodiments, a plurality of computer systems are in operative networked communication with one another through a network. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In some embodiments, the computer systems represent the nodes of the private block chain, such as the miner node or the like. In such an embodiment, each of the computer systems comprise the private block chain, providing for decentralized access to the block chain 708 as well as the ability to use a consensus mechanism to verify the integrity of the data therein. In some embodiments, an upstream system and a downstream system are further operatively connected to the computer systems and each other through the network. The upstream system further comprises a private ledger and the private block chain. The downstream system further comprises the private block chain and an internal ledger, which in turn comprises a copy of the private ledger.

In some embodiments, a copy of private block chain may be stored on a durable storage medium within the computer systems or the upstream system or the downstream system 706. In some embodiments, the durable storage medium may be RAM. In some embodiments, the durable storage medium may be a hard drive or flash drive within the system.

FIG. 4 illustrates high level process map for the application life-cycle transition record recreation process 100, in accordance with one embodiment of the present invention. Prior to the process 100, the system generates a block chain for application life-cycle transition record recreation. The block chain, described in further detail above, allows for a recording of each individual transaction and account within a complex transaction processing process. The block chain database generated is a decentralized block chain configuration that ensures block development and storage at each stage of the payment process. Accordingly, a block chain configuration may be used to maintain an accurate ledger of each application and process stage the transaction and/or account resides, in real time. A block chain typically includes several nodes, which may be one or more systems, machines, computers, databases, data stores or the like operably connected with one another as described in more detail above.

As illustrated in block 102, the process 100 is initiated by receiving a file batch from a client. The file batch may be a payment request, a payment for processing, a batch of payments for processing, or the like. As such, in some embodiments, the system may receive a payroll for a large corporation or the like to be processed internationally to one or more employees. The received file batch may be small in size, with one or several payment transactions associated with the file. In other embodiments, the received file batch may include millions or more transactions within a single file for payment transaction processing.

Next, as illustrated in block 104, the process 100 continues to slice the received files into batches based on an identification of requirements for processing. In this way, the system may slice the received files into individual transactions and place them into similar batches, the similar batches may be based on a geographic location of the transaction being cleared, an amount to be cleared, an originating entity, a receiving entity, to or the like.

As illustrated in block 106, the process 100 continues by assembling the sliced file data for the internal clearance. The internal clearance is based on entity origination requirements for clearance, the financial institution requirements, the country processing requirements, or the like. As illustrated in block 108 the system identifies the debit and credit accounts within the received file. As such, the system identifies the debited accounts associated with each of the files from the client and the credit accounts.

As illustrated in block 110, the process 100 continues by generating a record on a block chain of each step of processing the crediting and/or debiting of one or more accounts. Finally, as illustrated in block 112 the process 100 terminates by storing the blocks in a time specific relationship within the distributed ledger for historic record recreation. In this way, the system may generate a chain of blocks associated with each of the one or more steps or applications required during the payment processing. Using this record recreation, the system may create a detailed technical report to present to internal support teams within the entity and/or create a summary business report to present to external clients or entities.

FIG. 5 illustrates a process map for generating the block chain for application life-cycle transition record recreation 600, in accordance with one embodiment of the present invention. As illustrated, the process 600 includes a life-cycle of the transaction processing. The transaction processing may require one or more applications in order to process from initial receiving to clearance. As illustrated, the process 600 is initiated by receiving the files from the client, as illustrated in block 602. In some embodiments, these files may include one payment transaction. In some embodiments, these files may include several to millions of payment transactions. Upon initiation and reception of a file from the client, the system may generate an initial block on a block chain, as illustrated in block 626.

As such, the system utilizes blocks in a block chain environment as debit and/or credit blocks. Upon receiving a file and splitting the file into a batch for processing or for further splitting into payments, the system may generate a block for example debiting a file and crediting a batch. In this way, the block illustrates a transaction being debited from the file and being split into a batch, where the batch account is credited. This debiting and crediting generates blocks on a block chain that continually moves forward for each transaction tracking the transaction from initiation to external clearing.

As illustrated, the received files may be sliced or processed into batches of payment transactions for processing across one or more applications. As such, one or more batches may be generated from the received files. These batches may be generated based on system code slicing the files received based on processing requirements. In this way, the system may slice files into batches of transactions that are associated based on geographic location, processing requirements, or the like. As illustrated in FIG. 6, Batch 1 603, Batch 2 605, Batch 3 607, and Batch 4 609 were generated off of the received files from the client 602. At this point, the system generates a block in the block chain for the generation of each batch and each transaction within each batch, as illustrated in block 628. The blocks on the block chain, in some embodiments are generated as a function of a debit or a credit. Each time a file is parsed into a batch, the file debited and the batch is credited building blocks at each stage for the tracking of transactions.

Next, as illustrated, the process 600 continues by splitting the batches into payments to get recorded as a generated block, as illustrated in block 630. The payments that are generated in the example illustrated in FIG. 6 include Payment 1, 604, Payment 2 606, Payment 3 608, Payment 4 610, Payment 5 612, Payment 6 614, and Payment 7 616.

Once the payments are generated and the block is added to the block chain, the process continues by internally validating the payments, as illustrated in block 618. The system may identify the payments and validate that the payments are valid and funds can back the payments. The process of validating the payments includes generating a block for the block chain, as illustrated in block 632. The blocks on the block chain are continuous and build on in a chain built from the last block, generating a time related chain illustrating the process and applications that the transactions have been processed through.

As illustrated in block 620, the process 600 continues by internally clearing the payments. As each payment is cleared, the process logs and generates a block, as illustrated in block 634. Once the payments are internally validated and cleared, the process continues by building or reassembling the batches for external clearing, as illustrated. In the example illustrated in FIG. 6, the reassembled batches include Reassembled Batch 1 623, Reassembled Batch 2 625, Reassembled Batch 3 627, and Reassembled Batch 4 629. As each batch is reassembled, the process triggers the logging and generating of a block, as illustrated in block 636.

Next, as illustrated in block 622, the process 600 continues by reassembling the files based on the external clearing entity. The reassembled files process triggers the generation of a block, as illustrated in block 638. Finally, as illustrated in block 624, the process 600 is completed by delivering the external clearance of the payment. This delivery triggers the generation of a block, as illustrated in block 640.

Finally, the blocks generated, blocks 626, 628, 630, 632, 634, 636, 638, and 640, at each process within the payment processing environment is then stored in time order in a distributed ledger for recreation of historical records of the transaction process for each account or transaction within the process, as illustrated in block 642.

FIG. 6 provides a detailed process map illustrating generation of the block chain for application life-cycle transition record recreation 800, in accordance with one embodiment of the present invention. As illustrated in block 810, the processing system 804 receives a file to be processed. The file may be one or more payments or transactions that require debiting of an account and crediting of another account. The processing may be a complex payment processing from origination to clearance requiring the following of one or more regulations, international policies, internal clearance policies, and the like for clearance of the payment via a payment rail. Alternatively, the file may include data of any kind that needs to be processed through one or more applications. In this way, the system may track any data movement through the processing of that data based on block building onto a block chain with metadata for searchability of the chain and the events that triggered the building of the chain.

Once the file is received, the system triggers a request to be written from the ledger gateway 806, as illustrated in block 812. This request is to generate a block on the block chain distributed network 807. The new block is the generation of a new chain, as illustrated in block 814. In some embodiments, a new block may be generated for each transaction within the file. In other embodiments, a single block may be generated with information about each transaction being received at the processing system 804 with subsequent multiple chains being built there off of. The built block comprises data about the application or process that the payment just completed, a time stamp of completion, an identification of the payment, and metadata with searchable code that is unique to the payment for tracking of the payment throughout the process. As illustrated, once the block is generated, the distributed ledger 808 may store the record of the new block 816 and the new chain being generated.

As such, the system utilizes blocks in a block chain environment as debit and/or credit blocks. Upon receiving a file and splitting the file into a batch for processing or for further splitting into payments, the system may generate a block for example debiting a file and crediting a batch. In this way, the block illustrates a transaction being debited from the file and being split into a batch, where the batch account is credited. This debiting and crediting generates blocks on a block chain that continually moves forward for each transaction tracking the transaction from initiation to external clearing.

Next, as illustrated in block 824, the processing of the payment via the processing system 804 continues by separating the received payment file into batches and/or payments. Again, a step in the process triggers the ledger gateway 806 to write a request 822 for generation of a block on the block chain. The block chain distributed network 807 may add a block 820 to the earlier generated block. The block is then stored in the distributed ledger 808 in a time related manner with respect to the first block, as illustrated in block 818. In this way, each time a processing step or application is run against a single payment, a block is generated and associated with the metadata that is matched to that specific payment. The chain of blocks is generated and linked together based on the metadata code for record keeping.

Once the payments have been parsed out into appropriate data bundles for application processing, the process 800 continues by allowing the processing applications 802 to determine the appropriate processing application and processing platform 826 for each of the payments within a received file for clearance. The applications required for processing may be invoked, as illustrated in block 828. In this way, the appropriate application may receive the payments for processing in the appropriate order. As the payment is being processed and is completing a stage or application of the processing, the ledger gateway 806 may write a request for each processing step and/or each application the payment passes through, as illustrated in block 830. A block is added for each processing step, as illustrated in block 832 and each block is stored as the next block in the chain for that payment as illustrated in block 834.

Upon activation of the applications for processing the payments the process 800 continues by processing the payment transactions to external clearance, as illustrated in block 836. Upon processing the payments to external clearance the ledger gateway 806 may be triggered to write a request for a block to be added, as illustrated in block 383. The block 840 may be added and the distributed ledger 808 may store in a searchable format based on the metadata associated with the blocks the final clearance of the payment in a final block on the chain of blocks illustrating each processing step in the chain of that payment in a life-cycle transition record recreation format, as illustrated in block 842.

FIG. 7 provides a process map illustrating transformation and distribution of the record 900, in accordance with one embodiment of the present invention. As illustrated in block 902, the process 900 is initiated by compiling block chain records of events during a complete payment processing. In this way, each block chain record may correspond to the processing events of one payment transaction from origination to final external clearance. In some embodiments, each event may include a payment being processed through an application, a payment being batched, a relocation of a payment, or the like within the processing of the complex payment process.

Next, as illustrated in block 904, the process 900 continues by generating an application life-cycle transaction record for the payment. In this way, each payment may have a life-cycle transaction record that includes origination, each step in the processing, the time stamp of each step, the time each step took to complete, and the external clearance. The application life-cycle transaction record may be searchable via metadata embedded into each block associated with the payment, wherein the metadata code is a unique identifier for the particular payment.

As illustrated in block 906, a user may utilize the metadata to search and find complex tracking and tracing across accounts. In this way, the user may utilize the generated application life-cycle transaction record to search for a specific account, specific payment, specific application, or the like within the payment process. As such, based on the unique code associated with the metadata for each block or each chain, a user may be able to search and view an application life-cycle transaction record.

In some embodiments, the metadata that is searchable within each block of the block chain may include a time stamp of when the file/batch/payment was received from the client, a client reference identification for the file/batch/payment, a depositing account, a client account, or the like. In this way, each time a transaction is parsed down or repopulated to a file/batch/payment, the data associated with where the transaction came from, such as the client, file/batch/payment, or the like may all be compiled into the blocks of the block chain as metadata. In this way, the records for the block chain are stored for each event, such as each time a transaction is moved from or to a file/batch/payment. At each level, the system stores a block associated with the transaction, which includes information about the file/batch/payment, the originating client, originating client identification, terminating account, time stamps for the processing, and the like. Furthermore, in some embodiments, a block is generated for each file, batch, or payment created and includes the transactions with in the file/batch/payment. All of the data associated with the transaction from the amount, time, originating account, originating client, recipient account, and the like are stored as metadata within each block in order to provide searchable tracking and tracing for the transactions being processed.

In some embodiments, as illustrated in block 908, the system may generate a detailed technical report to present to entity associates about the processing of the payment and the application functionality of the life-cycle, thereby allowing for monitoring of operation, efficiencies, and weaknesses within the applications of the process.

In some embodiments, as illustrated in block 910, the system may generate a summary business report for clients who desire to review payment processing of their payments.

In this way we have an end-to-end monitoring of a complex payment processing. This is applying block chain to that use case. As such, a distributed ledger can be used to store complex payment structures and their transitions across the application life cycles to recreate the historic record. The block chain would trigger work flow. In this instance there are different account classes within a file account type. The distributed ledger may credit that a $X,XXX because that's what the value is of that file. Then as that gets shredded into its batches creating records inside of the batch account as credits. As such, this file account that has been credited a $X,XXX. That file account comprises ten $XXX batches. The block chain creates the initial credit of $X,XXX on one account. Then creates a record in the block that is debiting that account of the $X,XXX and crediting of the ten $XXX accounts.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for application life-cycle transition record recreation, the system comprising:
    a memory device with computer-readable program code stored thereon;
    a communication device;
    a processing device operatively coupled to the memory device and the communication device, wherein the processing device is configured to execute the computer-readable program code to:
        receive a file for processing to external clearing, wherein the file comprises one or more transactions;
        process the file through processing structure to slice the file into batches, wherein each transaction is sliced from the file into one of the batches, wherein placement of the each transaction into the one of the batches is based on a geographic location of the each transaction or a clearance amount of the each transaction;
        generate blocks on a private block chain distributed network, wherein the blocks comprise a debit of the file and a credit the batch upon parsing;
        process the batch into payments via parsing;
        add blocks to the private block chain distributed network, wherein the blocks comprise a debit of the batch and a credit the payment upon parsing;
        reassemble the payment into batches and files for external clearing;
        add blocks to the private block chain distributed network, wherein the blocks comprise a credit of the batch and a debit of the payment upon reassembly;
        compile the blocks for each transaction across the private block chain distributed network; and
        generate an application life-cycle record for each transaction including steps of origination, processing steps, and external clearance, wherein the application life-cycle record comprises a time stamp for completion of each step.

2. The system of claim 1, wherein the blocks are formed into a block chain, wherein the block chain is associated with one transaction from the one or more transactions within the received file.

3. The system of claim 1, wherein the block chain forms a life-cycle recreation of the transaction illustrating each file, batch, or payment being credited or debited with the transaction through the processing to external clearance.

4. The system of claim 1, further comprising searching and tracking of transactions via searchable metadata coded into the blocks of the block chain that are unique to each transaction, wherein searching for the metadata associated with a specific transaction generates a life-cycle report of the processing of the specific transaction.

5. The system of claim 1, further comprising triggering a generation of a block and associating the block with a block chain on the private block chain distributed network upon processing of a transaction through an application or event during the processing to external clearing.

6. The system of claim 1, wherein receiving the file further comprises receiving from a client a file of one or more payments for processing and external clearing to a user, wherein the transaction is an individual payment from the client to the user.

7. The system of claim 1, further comprising processing the one or more transactions as payments for validation and internal clearance prior to reassembling into a batch and file for external clearing.

8. A computer program product for application life-cycle transition record recreation, the computer program product comprising at least one non-transitory computer-readable medium having computer-readable program code portions embodied therein, the computer-readable program code portions comprising:
    an executable portion configured for receiving a file for processing to external clearing, wherein the file comprises one or more transactions;
    an executable portion configured for processing the file through processing structure via parsing the file to a batch;
    an executable portion configured for generating blocks on a private block chain distributed network, wherein the blocks comprise a debit of the file and a credit the batch upon parsing;
    an executable portion configured for processing the file through processing structure to slice the file into batches, wherein each transaction is sliced from the file into one of the batches, wherein placement of the each transaction into the one of the batches is based on a geographic location of the each transaction or a clearance amount of the each transaction;

an executable portion configured for adding blocks to the private block chain distributed network, wherein the blocks comprise a debit of the batch and a credit the payment upon parsing;

an executable portion configured for reassembling the payment into batches and files for external clearing;

an executable portion configured for adding blocks to the private block chain distributed network, wherein the blocks comprise a credit of the batch and a debit of the payment upon reassembly;

an executable portion configured for compiling the blocks for each transaction across the private block chain distributed network; and an executable portion configured for generating an application life-cycle record for each transaction including steps of origination, processing steps, and external clearance, wherein the application life-cycle record comprises a time stamp for completion of each step.

9. The computer program product of claim 8, wherein the blocks are formed into a block chain, wherein the block chain is associated with one transaction from the one or more transactions within the received file.

10. The computer program product of claim 8, wherein the block chain forms a life-cycle recreation of the transaction illustrating each file, batch, or payment being credited or debited with the transaction through the processing to external clearance.

11. The computer program product of claim 8, further comprising an executable portion configured for searching and tracking of transactions via searchable metadata coded into the blocks of the block chain that are unique to each transaction, wherein searching for the metadata associated with a specific transaction generates a life-cycle report of the processing of the specific transaction.

12. The computer program product of claim 8, further comprising an executable portion configured for triggering a generation of a block and associating the block with a block chain on the private block chain distributed network upon processing of a transaction through an application or event during the processing to external clearing.

13. The computer program product of claim 8, wherein receiving the file further comprises receiving from a client a file of one or more payments for processing and external clearing to a user, wherein the transaction is an individual payment from the client to the user.

14. The computer program product of claim 8, further an executable portion configured for comprising processing the one or more transactions as payments for validation and internal clearance prior to reassembling into a batch and file for external clearing.

15. A computer-implemented method for application life-cycle transition record recreation, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

receiving a file for processing to external clearing, wherein the file comprises one or more transactions;

processing the file through processing structure to slice the file into batches, wherein each transaction is sliced from the file into one of the batches, wherein placement of the each transaction into the one of the batches is based on a geographic location of the each transaction or a clearance amount of the each transaction;

generating blocks on a private block chain distributed network, wherein the blocks comprise a debit of the file and a credit the batch upon parsing;

processing the batch into payments via parsing;

adding blocks to the private block chain distributed network, wherein the blocks comprise a debit of the batch and a credit the payment upon parsing;

reassembling the payment into batches and files for external clearing;

adding blocks to the private block chain distributed network, wherein the blocks comprise a credit of the batch and a debit of the payment upon reassembly;

compiling the blocks for each transaction across the private block chain distributed network; and generating an application life-cycle record for each transaction including steps of origination, processing steps, and external clearance, wherein the application life-cycle record comprises a time stamp for completion of each step.

16. The computer-implemented method of claim 15, wherein the blocks are formed into a block chain, wherein the block chain is associated with one transaction from the one or more transactions within the received file.

17. The computer-implemented method of claim 15, wherein the block chain forms a life-cycle recreation of the transaction illustrating each file, batch, or payment being credited or debited with the transaction through the processing to external clearance.

18. The computer-implemented method of claim 15, further comprising searching and tracking of transactions via searchable metadata coded into the blocks of the block chain that are unique to each transaction, wherein searching for the metadata associated with a specific transaction generates a life-cycle report of the processing of the specific transaction.

19. The computer-implemented method of claim 15, further comprising triggering a generation of a block and associating the block with a block chain on the private block chain distributed network upon processing of a transaction through an application or event during the processing to external clearing.

20. The computer-implemented method of claim 15, further comprising processing the one or more transactions as payments for validation and internal clearance prior to reassembling into a batch and file for external clearing.

* * * * *